United States Patent
Suzuki

(10) Patent No.: US 6,265,806 B1
(45) Date of Patent: *Jul. 24, 2001

(54) SEMICONDUCTOR MICROACTUATOR WITH AN IMPROVED PLATFORM STRUCTURE AND METHOD OF FORMING THE SAME

(75) Inventor: Kenichiro Suzuki, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,638

(22) Filed: May 25, 1999

(30) Foreign Application Priority Data

May 25, 1998 (JP) .................................. 10-142459

(51) Int. Cl.$^7$ ....................................................... H02N 1/00
(52) U.S. Cl. ................................................................ 310/309
(58) Field of Search ............................................. 310/309

(56) References Cited

U.S. PATENT DOCUMENTS

| 4,065,677 | * | 12/1977 | Micheron et al. ................... 307/112 |
| 5,043,043 | * | 8/1991 | Howe et al. ......................... 156/645 |

FOREIGN PATENT DOCUMENTS

| 3-159584 | * | 7/1991 | (JP) | ...................................... 310/309 |
| 04-008181 | * | 1/1992 | (JP) | ...................................... 310/309 |
| 4-285478 | * | 10/1992 | (JP) | ...................................... 310/309 |
| 4-368479 | | 12/1992 | (JP) | ................................. H02N/1/00 |
| 05-091761 | * | 4/1993 | (JP) | ...................................... 310/309 |
| 5-260766 | | 10/1993 | (JP) | ................................. H02N/1/00 |
| 6-98566 | | 4/1994 | (JP) | ................................. H02N/1/00 |
| 7-123741 | | 5/1995 | (JP) | ................................. H02N/1/00 |
| 7-123743 | | 5/1995 | (JP) | ................................. H02N/1/00 |
| 9-219423 | | 8/1997 | (JP) | ................................. H01L/21/60 |
| 10-109245 | * | 4/1998 | (JP) | ...................................... 310/309 |
| 10-239578 | | 9/1998 | (JP) | .................................... G02B/7/04 |
| 10-327588 | | 12/1998 | (JP) | ................................. H02N/1/00 |

* cited by examiner

Primary Examiner—Thomas M. Dougherty
(74) Attorney, Agent, or Firm—Young & Thompson

(57) ABSTRACT

A microactuator with a platform mounted to a movable part of the microactuator, where at least a part of the platform includes at least a dielectric material so that the platform has a smaller dielectric constant than metals. More particularly, the microactuator includes a semiconductor substrate, a stator fixed to the semiconductor substrate where the stator has a stator electrode, a movable part floated from the stator and the semiconductor substrate where the movable part has a movable electode, a plurality of contacts which are in contact with parts of the platform and the movable electrode, and a platform on the contacts so that the platform is fixed to the movabled electrode through the contacts. At least a part of the platform includes a dielectric material to reduce an interaction of the platform with the electrodes when the electrodes are interacting with each other to move the movable part.

7 Claims, 10 Drawing Sheets

SEMICONDUCTOR MICROACTUATOR WITH AN IMPROVED PLATFORM STRUCTURE AND METHOD OF FORMING THE SAME

BACKGROUND OF THE INVENTION

The present invention relates to a microactuator and a method of forming the same, and more particularly to a micro-actuator suitable for driving a small size device such as optical devices, optomagnetic and magnetic devices.

A conventional small actuator is mounted on a top of a suspension of a magnetic head for driving a slider. This was proposed by L. S. Fan and is disclosed in IEEE Transactions On Industrial Electronics, vol. 42, No. 3, pp. 222–233, June 1995 entitled "Magnetic Recording Head Positioning At Very High Track Densities Using A Microactuator Based Two-Stage Servo System". FIG. 1 is a plan view illustrative of a conventional microactuator. FIG. 2 is a partially enlarged view of an area "A" in FIG. 1 illustrative of the conventional microactuator. FIG. 3 is a cross sectional elevation view illustrative of the conventional microactuator taken along an A—A line in FIG. 2. In FIGS. 1 and 2, illustrations of a structure of a platform are eliminated. The microactuator has a pair of stators 83 and 84 provided on opposite sides of a silicon substrate 100 and separated from each other in a first direction, and a movable part 82 positioned between the stators 83 and 84. The movable part 82 is supported by sprig members 81 which are provided on spring fixing stages 80 fixed to the silicon substrate 100 so that the movable part 82 is floated or isolated from tile silicon substrate 100.

Each of the stators 83 and 84 has a stator extending portion which extends toward inside regions and in the first direction and also extends along a longitudinal center line. The stator extending portion has many stator comb-tooths portions 91 which extend from both sides of each of the stator extending portions in a second direction perpendicular to the first direction, thereby to form a comb-shape, wherein the stator comb-tooth portions 91 are arranged at a first constant pitch in the first direction and extend in the second direction. Each of the stator comb-tooth portions 91 has comb-tooth shaped stator electrodes 93 which extend from one side of the stator comb-tooth portion 91, wherein the comb-tooth shaped stator electrodes 93 extend in the first direction at a second constant pitch.

The movable part 82 comprises first and second side frame portions extending in the first direction and separated form each other in the second direction and a center frame portion extending in the second direction to connect the first and second side frame portions to each other. Each of the first and second side frame portions has many movable comb-tooth portions 92 which extend from the side toward the longitudinal center line in the second direction, thereby to form a comb-shape, wherein the movable comb-tooth portions 92 are arranged at a third constant pitch in the second direction and extend in the first direction. The many movable comb-tooth portions 92 and the many stator comb-tooth portions 91 are alternately aligned in the first direction, whereby each of the many movable comb-tooth portions 92 is positioned between adjacent two of the many stator comb-tooth portions 91. Each of the movable comb-tooth portions 92 has comb-tooth shaped movable electrodes 94 which extend from one side of the movable comb-tooth portion 92, wherein the comb-tooth shaped movable electrodes 94 extend in the first direction at a fourth constant pitch, so that the comb-tooth shaped movable electrodes 94 and the comb-tooth shaped stator electrodes 93 are alternately aligned in the second direction, whereby each of the comb-tooth shaped movable electrodes 94 is positioned between adjacent two of the comb-tooth shaped stator electrodes 93. The stator comb-tooth portion 91 is wider in width than the movable comb-tooth portion 92. The comb-tooth shaped stator electrodes 93 are wider in width than the comb-tooth shaped movable electrodes 94. The comb-tooth shaped stator electrodes 93 are adhered onto the silicon substrate 100 together with the many stator comb-tooth portions 91. The comb-tooth shaped movable electrodes 94 are separated or floated from the silicon substrate 100 together with the movable comb-tooth portion 92.

A voltage is applied across the comb-tooth shaped movable electrodes 94 and the comb-tooth shaped stator electrodes 93 so that the movable part 82 is driven to be moved in the first direction. The voltage application across the comb-tooth shaped movable electrodes 94 of the movable part 82 and the comb-tooth shaped stator electrodes 93 of the second stator 84 causes the movable part 82 to move toward the second stator 84. The voltage application across the comb-tooth shaped movable electrodes 94 of the movable part 82 and the comb-tooth shaped stator electrodes 93 of the first stator 83 causes the movable part 82 to move toward the first stator 83.

As illustrated in FIG. 3, a platform 72 is provided over the movable comb-tooth portions 92 of the movable part 82, wherein the platform 72 has contact ridge portions 73 which are in contact with the top surfaces of the movable comb-tooth portions 92 of the movable part 82. In Fan et al. proposed structure, the contact ridge portions 73 are formed almost entirely over the movable comb-tooth portions 92 of the movable part 82. The platform 72 is used for allowing a magnetic head or a slider to be mounted thereon.

The above conventional microactuator has been fabricated as follows. A phospho silicate glass pattern of 2 micrometers in thickness is formed on a first region of the silicon substrate 100, wherein the first region is for later formation of the above movable part 82. A photo-resist pattern is then formed on the phospho silicate glass pattern by use of a photo-lithography technique. A copper plating method is carried out to form copper films between apertures of the photo-resist pattern. A platform pattern is then formed by use of other photo-lithography technique and subsequent copper plating method before the phosphosilicate glass pattern is removed by an etchant of hydrofluoric acid solution so as to isolate the movable part 82 and the comb-tooth shaped movable electrodes 94 from the silicon substrate 100, whereby the microactuator and the platform are formed. Namely, this actuator is formed by the electroplating technique.

It has been known that a polysilicon thin film is used for the microactuator fabricated by utilizing a silicon IC process. This microactuator having the polysilicon thin film is superior in conformability with the silicon IC process and also in mechanical characteristics as compared to the above electroplated microactuator. In order to apply this second microactuator having the polysilicon film to the magnetic head or the optomagnetic head, it is, however, necessary to suppress motion of the head in other directions to the intended direction. For example, the microactuator shown in FIG. 1 is required to cause the movable part 82 to move in the first direction but required to suppress any motion of the movable part 82 in a vertical direction to the first and second directions. In order to suppress the motion of the movable part 82 in the vertical direction, it is effective to increase the thickness of the springs 81. In view of utilizing a large electrostatic force, it is also important to increase the thicknesses of the comb-tooth shaped movable electrodes 94 and the comb-tooth shaped stator electrodes 93.

Accordingly, it had been required to form the actuator having a thickness of not less than 20 micrometers. Notwithstanding, a practically possible maximum thickness of the polysilicon film is about 4 micrometers which is much thinner than the required thickness. For those reasons, the above plating technique for forming the electro-plated actuator and the following other type microactuator had been developed. The other type microactuator may be formed by etching technique for etching a single crystal silicon layer.

The actuator having the silicon crystal silicon film may be formed by use of an silicon-on-insulator substrate. This technique was proposed by A. Benitez et al. and is disclosed in Sensors and Actuators, A50, pp. 99–103, 1995, entitled "Bulk silicon microelectromechanical devices fabricated from commercial bonded and etched-back silicon-on-insulator substrates". The use of this technique allows the comb-tooth shaped movable electrodes 94 and the comb-tooth shaped stator electrodes 93 to be formed from a single crystal silicon layer of 20 micrometers in thickness. The comb-tooth shaped stator electrodes 93 and the many stator comb-tooth portions 91 are fixed through a silicon oxide layer to the silicon substrate 100. The silicon oxide film underlying the comb-tooth shaped movable electrodes 94 is removed by a hydrofluoric acid solution as an etchant, so that the comb-tooth shaped movable electrodes 94 is made floated or isolated from the silicon substrate 100. Since the comb-tooth shaped movable electrodes 94 is narrower in width than the comb-tooth shaped stator electrodes 93 and also the movable comb-tooth portions 92 is narrower in width than the stator comb-tooth portions 91, the silicon oxide film remains under the comb-tooth shaped stator electrodes 93 and the stator comb-tooth portions 91 even after the wet etching has been carried out by use of the hydrofluoric acid solution. The comb-tooth shaped movable electrodes 94 having the single crystal silicon film and the comb-tooth shaped stator electrodes 93 also having the single crystal silicon film may be formed over the silicon substrate 100.

The above conventional fabrication method is, however, engaged with the following four problems.

The first problem is concerned with a difficulty for the electroplating actuator to comply with the requirement for high speed responsibility of the microactuator. In the electroplating technique, any available materials for the platform are limited into metals. The metals have relatively large densities. For example, copper is 8.9. The use of the metal platform cases the platform weight to become heavy. The combination of the platform and the movable part forms a resonator of the microactuator, for which reason the increase in the weight of the platform causes a resonant frequency to be dropped. The drop in resonant frequency of the microactuator causes a response speed of the mnicroactuator to become slow, even a high speed responsibility is actually required for applying the microactuator to the advanced magnetic head or optomagnetic head.

The second problem is concerned a complication in fabrication process for the microactuator. A voltage is applied across the comb-tooth shaped movable electrodes 94 and the comb-tooth shaped stator electrodes 93 in order to drive the microactuator As illustrated in FIG. 3, the platform 72 is equal in potential to the movable comb-tooth portions 92 of the movable part 82, for which reason a voltage application across the movable comb-tooth portions 92 and the stator comb-tooth portions 91 causes an electrostatic force to be applied to the platform 72, whereby the platform 72 is attracted toward the stator comb-tooth portions 91. Since the stator comb-tooth portions 91 is positioned under the platform 72, the platform 72 is thus forced by the electrostatic force to move downwardly. A displacement of the platform 72 downwardly by the electrostatic force depends upon a level of the voltage applied across the movable comb-tooth portions 92 and the stator comb-tooth portions 91. This displacement in the vertical direction or the downward direction of the platform 72 makes it difficult to realize a highly accurate positioning of the head. In order to suppress the displacement in the downward direction of the platform 72 by the electrostatic force depending upon the applied voltage level, it is effective to increase a distance between the platform 72 and the stator comb-tooth portions 91. In order to increase the distance between the platform 72 and the stator comb-tooth portions 91, it is required to increase the height of the contact ridge portions 73 of the platform 72. This increase in the height of the contact ridge portions 73 of the platform 72 causes the fabrication process to be complicated.

The third problem is concerned with a low yield of the microactuator due to complicated and many fabrication processes therefor. The actuator having the platform is fabricated by the sequential and complicated processes as described above. A large number of the fabrication processes and the complication of the processes make it difficult to increase the yield of the microactuator. Particularly, it is difficult to form the platform after the microactuator has been fabricated because it is necessary to form the contact ridge portions 73 and the platform 72 over the microactuator pattern having a large unevenness of more than 20 micrometers. Further, the satisfaction to the requirement for increase in the height of the contact ridge portions 73 of the platform 72 makes it difficult to form the microactuator in the sequential fabrication processes.

The fourth problem is concerned with no concrete proposal having been made for how to mount the platform onto the movable part in the microactuator using the single crystal silicon layer. It may be considered to form the platform by use of the electroplating technique on the movable part of the microactuator having already been formed. However, the use of the electroplating technique for forming the platform on the movable part of the microactuator causes the above first, second and third problems as described above.

In the above circumstances, it had been required to develop a novel microactuator and a method of forming the same free from the above first, second, third and fourth problems.

SUMMARY OF THE INVENTION

Accordingly, it is an object of the present invention to provide a novel microactuator free from the above first, second, third and fourth problems.

It is a further object of the present invention to provide a novel microactuator which is improved in high speed responsibility.

It is a still further object of the present invention to provide a novel microactuator which is improved in operational stability.

It is yet a further object of the present invention to provide a novel microactuator which is improved in mechanical characteristics.

It is a further more object of the present invention to provide a novel platform structure of a microactuator free from the above first, second, third and fourth problems.

It is still a further object of the present invention to provide a novel platform structure of a microactuator which is improved in high speed responsibility.

It is moreover an object of the present invention to provide a novel platform structure of a microactuator which is improved in operational stability.

It is another object of the present invention to provide a novel platform structure of a microactuator which is improved in mechanical characteristics.

It is still another object of the present invention to provide a novel method of fabricating a microactuator free from the above first, second, third and fourth problems.

It is yet another object of the present invention to provide a novel method of fabricating a microactuator which allows realization of high yield.

It is further another object of the present invention to provide a novel method of fabricating a microactuator which is improved in high speed responsibility.

It is an additional object of the present invention to provide a novel method of fabricating a microactuator which is improved in operational stability.

It is a still additional object of the present invention to provide a novel method of fabricating a microactuator which is improved in mechanical characteristics.

It is yet an additional object of the present invention to provide a novel method of fabricating a platform structure of a microactuator free from the above first, second, third and fourth problems.

It is a further additional object of the present invention to provide method of fabricating a platform structure of a microactuator which allows realization of high yield.

It is also an additional object of the present invention to provide method of fabricating a platform structure of a microactuator which is improved in high speed responsibility.

It is also an additional object of the present invention to provide method of fabricating a platform structure of a microactuator which is improved in operational stability.

It is also additional an object of the present invention to provide method of fabricating a platform structure of a microactuator which is improved in mechanical characteristics.

The primary aspect of the present invention provides a platform mounted to the movable part of the microactuator, wherein at least a part of the platform comprises at least a dielectric material so that the platform has a smaller dielectric constant than metals. The secondary aspect of the present invention provides a microactuator comprising: a semiconductor substrate; at least a stator fixed to the semiconductor substrate, and the stator having at least a stator electrode; at least a movable part floated from the stator and the semiconductor substrate, and the movable part having at least a movable electrode; a plurality of contacts which are in contact with parts of the platform and the movable electrode; a platform on the contacts so that the platform is fixed to the movable electrode through the contact, wherein at least a part of said platform comprises at least a dielectric material so that said platform has a smaller dielectric constant than metals.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
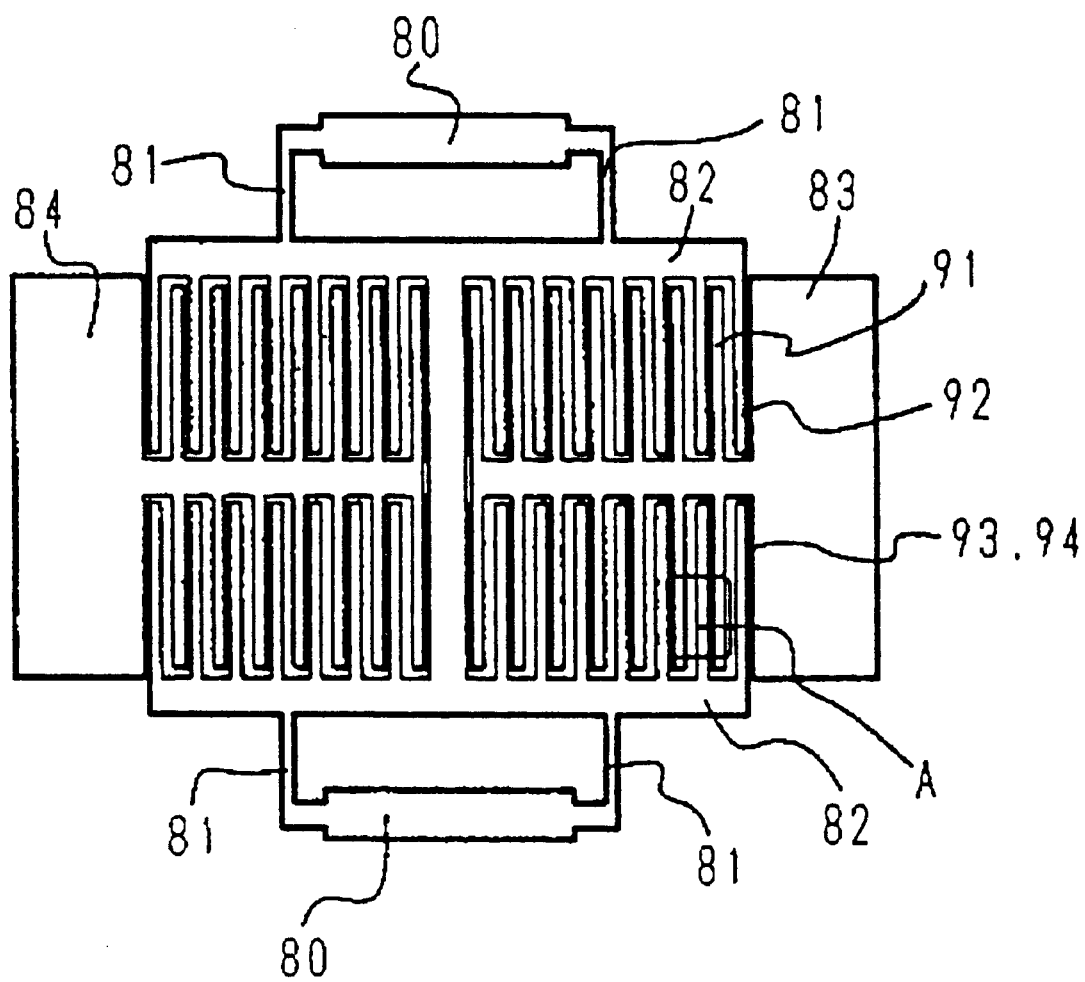
FIG. 1 is a plan view illustrative of a conventional microactuator.
Figure 2:
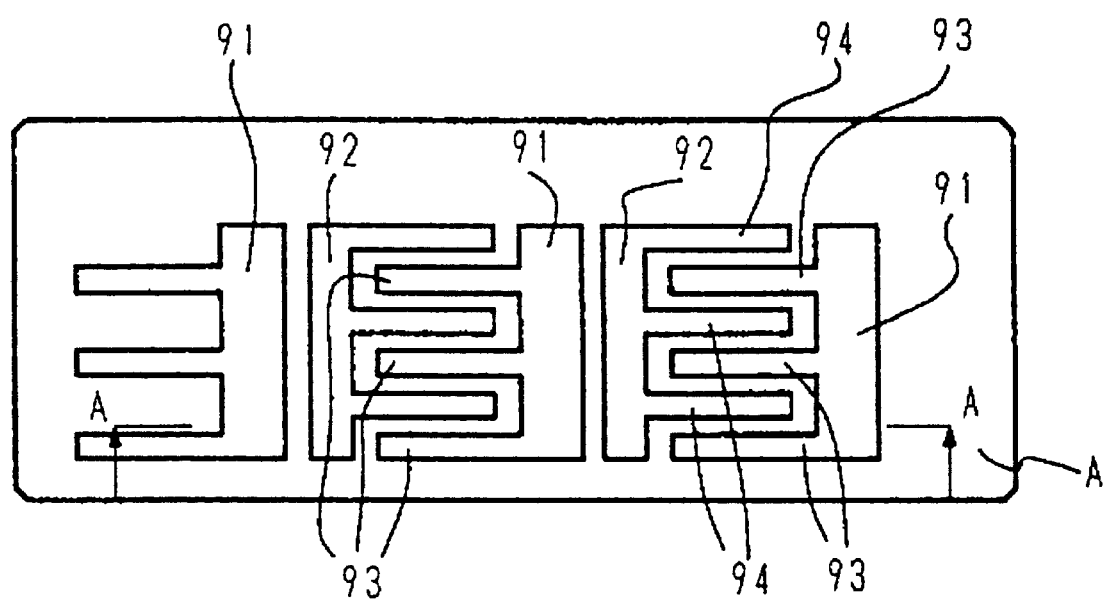
FIG. 2 is a partially enlarged view of an area "A" in FIG. 1 illustrative of the conventional microactuator.

The primary present invention provides a platform mounted to the movable part of the microactuator, wherein at least a part of the platform comprises at least a dielectric material so that the platform has a smaller dielectric constant than metals. The secondary present invention provides a microactuator comprising: a semiconductor substrate; at least a stator fixed to the semiconductor substrate, and the stator having at least a stator electrode; at least a movable part floated from the stator and the semiconductor substrate, and the movable part having at least a movable electrode; a plurality of contacts which are in contact with parts of the platform and the movable electrode; a platform on the contacts so that the platform is fixed to the movable electrode through the contact, wherein at least a part of said platform comprises at least a dielectric material so that said platform has a smaller dielectric constant than metals.

In accordance with the second present invention, the platform has such a structure as to have a smaller dielectric constant than metals. Namely, the platform may be made of a single dielectric material. Alternatively, the platform may be made of a mixture of plural dielectric materials. Further alternatively, the platform may comprise a single dielectric layer or an insulation layer. Furthermore alternatively, the platform may comprise plural dielectric layers or insulation layers. Moreover alternatively, the platform may partially include at least one dielectric region or insulation layer in order to reduce the dielectric constant of the platform. In any event, at least a part of the platform includes a material having a smaller dielectric constant than metals in order to reduce the dielectric constant of the platform to be smaller than metals.

It is preferable that the platform is, therefore, made of an insulation material or a dielectric material which has a dielectric constant much lower than metals such as copper. By contrast to the present invention, the conventional platform is made of a metal such as copper. The use of dielectric material or the insulation material for the platform results in suppression of an electrostatic force to be applied between the platform and the stator of the microactuator. If, for example, the platform is made of a glass material having a dielectric constant of 4.1, then charges derived in the insulation material platform due to image-force caused by accumulated charges in the stator are reduced to about 60% of charges derived in the metal platform due to image-force caused by accumulated charges in the stator. An attractive force applied between the platform and the stator depends upon the distance between the platform and the stator and the amount of the charges derived in the platform. The distance between the platform and the stator is defined by the height of the contacts. Assuming that the height of the contacts for the insulation material platform is the same as the height of the contacts for the metal platform, the attractive force applied between the glass material platform and the stator is about 60% of the attractive force applied between the metal platform and the stator. Namely, the use of the glass material platform realizes about 40% reduction of the attractive force applied between the platform and the stator under the condition that the height of the contacts for the platform is unchanged. This means that the use of the insulation material for the platform allows a reduction in distance between the platform and the stator under the condition of unchanged attractive force applied between the platform and the stator Namely, the use of the insulation material for the platform allows a reduction in the height of the contacts under the condition of unchanged attractive force applied between the platform and the stator. If, for example, the glass material having the dielectric constant of 4.1 is used for the platform, it is possible to reduce the height of the contacts into 40% under the condition of unchanged attractive force applied between the platform and the stator.

Accordingly, the use of the dielectric material partially or entirely for the platform reduces the amount of charges derived in the platform so that the image-force applied between the platform and the stator is reduced. This reduction in the image-force applied between the platform and the stator further reduces the attractive force applied between the platform and the stator. This reduction in the attractive force applied between the platform and the stator suppresses the displacement of the platform toward the stator. This suppression to the displacement of the platform toward the stator allows a highly accurate positioning of the device such as magnetic or optomagnetic head mounted on the platform.

Alternatively, the platform may be made of a ceramic material or an organic polymer or other dielectric materials.

It is further preferable that the platform has a density lower than metals such as copper. If the platform is made of the glass material having a density of 2.2 which corresponds about one quarter of copper density, then the platform made of the glass material allows the microactuator to possess a resonant frequency which is higher by about two times than a resonant frequency of the actuator with the copper platform under the condition that the glass material platform has the same size than the copper platform. Namely, the platform is preferably made of the lower density material than metals, so that the microactuator possesses the higher resonant frequency, thereby allowing the microactuator exhibits an improved high speed responsibility required by the advanced magnetic or optomagnetic head.

Accordingly, the use of the lower density dielectric material partially or entirely for the platform reduces the mass of the platform which are fixed to the movable part of the microactuator. The reduction in the mass of the platform means the reduction in the total mass of the platform and the movable part, whereby the resonant frequency of the vibrator comprising the combined platform and the movable part is increased. The increase in the resonant frequency of the vibrator comprising the combined platform and the movable part allows the microactuator to be improved in the high speed responsibility for satisfying the requirement for realizing the advanced micro-devices such as the advanced magnetic head or the advanced optomagnetic head.

Furthermore, it is preferable that a plurality of contacts which are in contact with parts of the platform and the movable part. Namely, the contacts are formed partially or not entirely so as to reduce a total contact area of the contacts with the platform and the movable part. The reduction in the total contact area of the contacts with the platform and the movable part allows a secure adhesion or binding between the platform and the movable part with a small force. Notwithstanding, the contacts may extend entirely as in the conventional microactuator. The contacts may comprise bumps which include at least any one of a polysilicon layer, an insulation layer, a metal layer, and an organic layer. The platform may unitary be formed with the contacts.

Moreover, it is preferable that a side wall insulation layer is provided on side walls of at least any one of the stator electrode and the movable electrode, so that the stator electrode and said movable electrode are separated by the side wall insulation layer so as to prevent any possible formation of an electrical short circuit between the stator electrode and said movable electrode. The side wall insulation layer may comprise a silicon dioxide layer or a silicon nitride layer or combinations thereof.

The above improved platform structure may be applicable to any various kinds of actuators. The stator is usually formed over the semiconductor substrate. However, the above improved platform structure may be applicable to the actuator wherein the stator is mounted over the movable part. Alternatively, the above improved platform structure may also be applicable to the actuator wherein the movable part is mounted over the stator. Further alternatively, the above improved platform structure may also be applicable to the multilevel structured actuator, wherein a second level movable part or a second level stator is mounted over a first level movable part or a first level stator. For this reason, as described above, the primary present invention provides a platform mounted to the movable part of the microactuator, wherein at least a part of the platform comprises at least a dielectric material so that the platform has a smaller dielectric constant than metals.

A first embodiment according to the present invention will be described in detail with reference to FIGS. 4–6.

The microactuator has a pair of stators 13 and 14 provided on opposite sides of a silicon substrate 1 and separated from each other in a first direction, and a movable part 12 positioned between the stators 13 and 14. The movable part 12 is supported by spring members 11 which are provided on spring fixing stages 10 fixed to the silicon substrate 1 so that the movable part 12 is floated or isolated from the silicon substrate 1.

Each of the stators 13 and 14 has a stator extending portion which extends toward inside regions and in the first direction and also extends along a longitudinal center line. The stator extending portion has many stator comb-tooth portions 3 which extend from both sides of each of the stator extending portions in a second direction perpendicular to the first direction, thereby to form a comb-shape, wherein the stator comb-tooth portions 3 are arranged at a first constant pitch in the first direction and extend in the second direction. Each of the stator comb-tooth portions 3 has comb-tooth shaped stator electrodes 33 which extend from one side of the stator comb-tooth portion 3, wherein the comb-tooth shaped stator electrodes 33 extend in the first direction at a second constant pitch The movable part 12 comprises first and second side frame portions extending in the first direction and separated form each other in the second direction and a center frame portion extending in the second direction to connect the first and second side frame portions to each other. Each of the first and second side frame portions has many movable comb-tooth portions 4 which extend from the side toward the longitudinal center line in the second direction, thereby to form a comb-shape, wherein the movable comb-tooth portions 4 are arranged at a third constant pitch in the second direction and extend in the first direction. The many movable comb-tooth portions 4 and the many stator comb-tooth portions 3 are alternately aligned in the first direction, whereby each of the many movable comb-tooth portions 4 is positioned between adjacent two of the many stator comb-tooth portions 3. Each of the movable comb-tooth portions 4 has comb-tooth shaped movable electrodes 34 which extend from one side of the movable comb-tooth portion 4, wherein the comb-tooth shaped movable electrodes 34 extend in the first direction at a fourth constant pitch, so that the comb-tooth shaped movable electrodes 34 and the comb-tooth shaped stator electrodes 33 are alternately aligned in the second direction, whereby each of the comb-tooth shaped movable electrodes 34 is positioned between adjacent two of the comb-tooth shaped stator electrodes 33. The stator comb-tooth portion 3 is wider in width than the movable comb-tooth portion 4. The comb-tooth shaped stator electrodes 33 are wider in width than the comb-tooth shaped movable electrodes 34 The comb-tooth shaped stator electrodes 33 are adhered onto the silicon substrate 1 together with the many stator comb-tooth portions 3. The comb-tooth shaped movable electrodes 34 are separated or floated from the silicon substrate 1 together with the movable comb-tooth portion 4.

A voltage is applied across the comb-tooth shaped movable electrodes 34 and the comb-tooth shaped stator electrodes 33 so that the movable part 12 is driven to be moved in the first direction. The voltage application across the comb-tooth shaped movable electrodes 34 of the movable part 12 and the comb-tooth shaped stator electrodes 33 of the second stator 14 causes the movable part 12 to move toward the second stator 14. The voltage application across the comb-tooth shaped movable electrodes 34 of the movable part 12 and the comb-tooth shaped stator electrodes 33 of the first stator 13 causes the movable part 12 to move toward the first stator 13.

Figure 3:
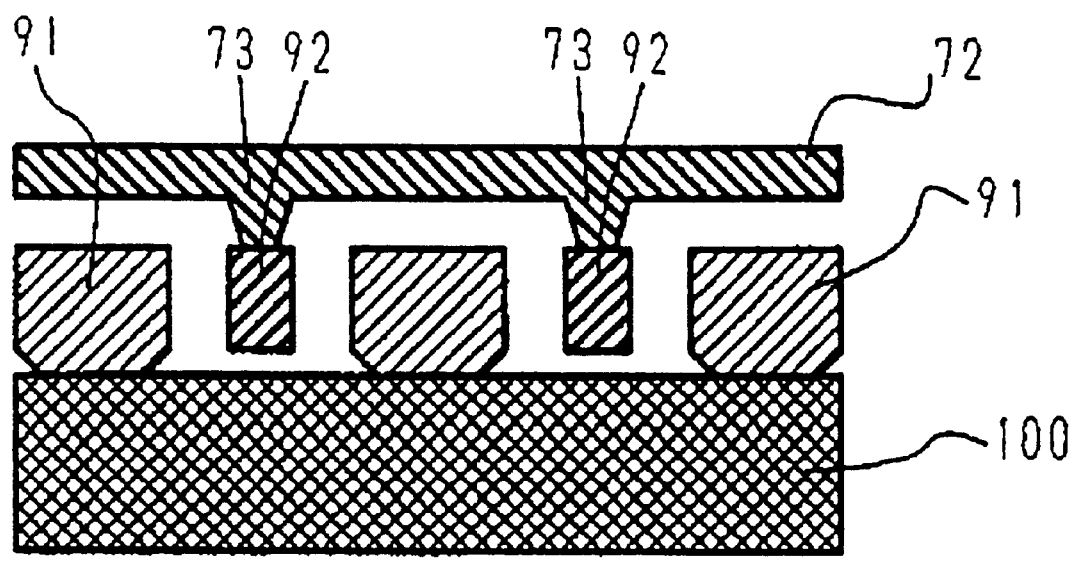
FIG. 3 is a cross sectional elevation view illustrative of the conventional microactuator taken along an A—A line in FIG. 2.
Figure 5:
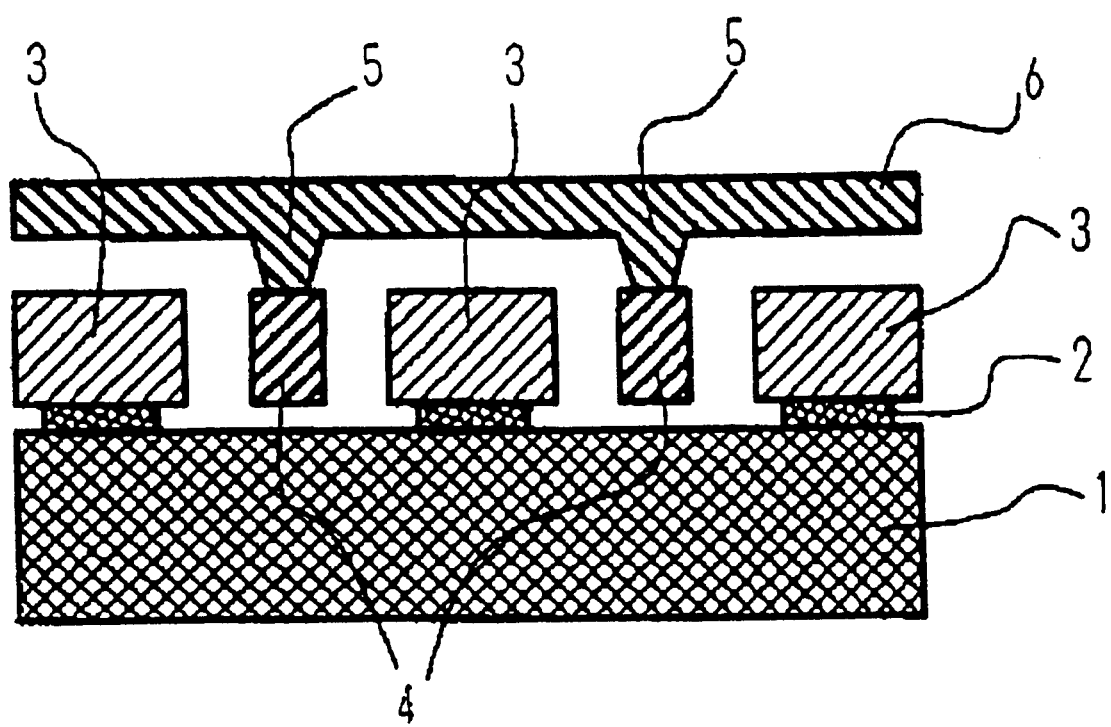
FIG. 5 is a cross sectional elevation view illustrative of a novel semiconductor microactuator with an improved platform in a first embodiment in accordance with the present invention.
Figure 6:
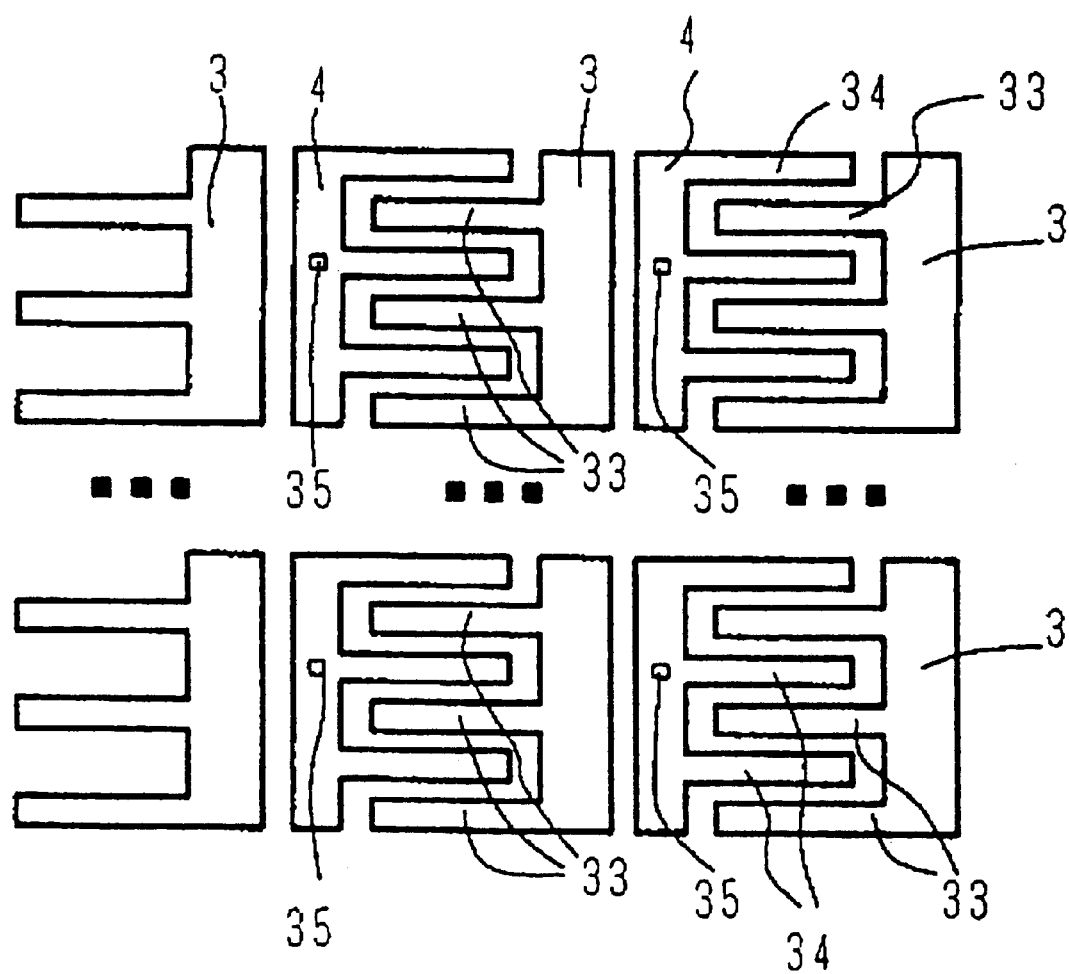
FIG. 6 is a partially enlarged plan view of a novel semiconductor microactuator with an improved platform shown in FIG. 5 in a first embodiment in accordance with the present invention.

As illustrated in FIG. 5, a platform 6 is provided over the movable comb-tooth portions 4 of the movable part 12, wherein the platform 6 has bumps 5 which are in contact with the top surfaces of the movable comb-tooth portions 4 of the movable part 12. The bumps 5 are provided on limited contact regions 35 FIG. 6 of the movable comb-tooth portions 4 of the movable part 12 so as to reduce the contact area. The platform 6 is used for allowing a magnetic head or a slider to be mounted thereon. In contrast, as noted above, Fan et al. includes contact ridge portions 73 (FIG. 3) that are formed almost entirely over the movable comb-tooth portions 92.

The movable comb-tooth portion 4 may comprise a single crystal silicon pattern having a width of 3 micrometers and a height of 20 micrometers. The stator comb-tooth portion 3 may comprise a single crystal silicon pattern having a width of 10 micrometers and a height of 20 micrometers. The comb-tooth shaped stator electrode 33 may compose a single crystal silicon pattern having a width of 3 micrometers and a height of 20 micrometers. The comb-tooth shaped movable electrode 34 may comprise a single crystal silicon pattern having a width of 3 micrometers and a height of 20 micrometers. The comb-tooth shaped stator electrode 33 is spaced from the silicon substrate 1. The stator comb-tooth portion 3 is however fixed to the substrate 1 so that the comb-tooth shaped stator electrode 33 is substantially fixed through the stator comb-tooth portion 3 to the substrate 1. The platform 6 comprises a glass plate having a thickness of about 0.2 millimeters.

In this embodiment, the bumps 5 comprise the same glass material as the platform 6 so that the bumps 5 are unitary formed with the platform 6. The bumps 5 have a height of about 4 micrometers.

In the above embodiment, side walls of the stator comb-tooth portion 3 and side walls of the movable comb-tooth portion 4 are shown. As a modification to the above, it is, however, possible that the side walls of the stator comb-tooth portion 3 and side walls of the movable comb-tooth portion 4 are covered by side wall insulation films. The side wall insulation film may comprise a silicon dioxide film having a thickness of 100 nanometers or a silicon nitride film having a thickness of 100 nanometers. The provision of the side wall insulation films on the side walls of the stator comb-tooth portion 3 and the movable comb-tooth portion 4 prevents any formation of a short circuit between the that the movable part and the stator.

In accordance with the present invention, the platform is, therefore, made of an insulation material or a dielectric material which has a dielectric constant much lower than metals such as copper. By contrast to the present invention, the conventional platform is made of a metal such as copper. The use of dielectric material or the insulation material for the platform results in suppression of an electrostatic force to be applied between the platform and the stator of the microactuator. If, for example, the platform is made of a glass material having a dielectric constant of 4.1, then charges derived in the insulation material platform due to image-force caused by accumulated charges in the stator are reduced to about 60% of charges derived in the metal platform due to image-force caused by accumulated charges in the stator. An attractive force applied between the platform and the stator depends upon the distance between the platform and the stator and the amount of the charges derived in the platform. The distance between the platform and the stator is defined by the height of the contacts. Assuming that the height of the contacts for the insulation material platform is the same as the height of the contacts for the metal platform, the attractive force applied between the glass material platform and the stator is about 60% of the attractive force applied between the metal platform and the stator. Namely, the use of the glass material platform realizes about 40% reduction of the attractive force applied between the platform and the stator under the condition that the height of the contacts for the platform is unchanged. This means that the use of the insulation material for the platform allows a reduction in distance between the platform and the stator under the condition of unchanged attractive force applied between the platform and the stator. Namely, the use of the insulation material for the platform allows a reduction in the height of the contacts under the condition of unchanged attractive force applied between the platform and the stator. If, for example, the glass material having the dielectric constant of 4.1 is used for the platform, it is possible to reduce the height of the contacts into 40% under the condition of unchanged attractive force applied between the platform and the stator.

Accordingly, the use of the dielectric material partially or entirely for the platform reduces the amount of charges derived in the platform so that the image-force applied between the platform and the stator is reduced. This reduction in the image-force applied between the platform and the stator further reduces the attractive force applied between the platform and the stator. This reduction in reduces the attractive force applied between the platform and the stator suppresses the displacement of the platform toward the stator. This suppression to the displacement of the platform toward the stator allows a highly accurate positioning of the device such as magnetic or optomagnetic head mounted on the platform.

Alternatively, the platform may be made of a ceramic material or an organic polymer or other dielectric materials.

It is further preferable that the platform has a density lower than metals such as copper. If the platform is made of the glass material having a density of 2.2 which corresponds about one quarter of copper density, then the platform made of the glass material allows the microactuator to possess a resonant frequency which is higher by about two times than a resonant frequency of the actuator with the copper platform under the condition that the glass material platform has the same size than the copper platform. Namely, the platform is preferably made of the lower density material than metals, so that the microactuator possesses the higher resonant frequency, thereby allowing the microactuator exhibits an improved high speed responsibility required by the advanced magnetic or optornagnetic head.

Accordingly, the use of the lower density dielectric material partially or entirely for the platform reduces the mass of the platform which are fixed to the movable part of the microactuator. The reduction in the mass of the platform means the reduction in the total mass of the platform and the movable part, whereby the resonant frequency of the vibrator comprising the combined platform and the movable part is increased. The increase in the resonant frequency of the vibrator comprising the combined platform and the movable part allows the microactuator to be improved in the high speed responsibility for satisfying the requirement for realizing the advanced micro-devices such as the advanced magnetic head or the advanced optomagnetic head.

Furthermore, it is preferable that a plurality of contacts which are in contact with parts of the platform and the movable part. Namely, the contacts are formed partially or not entirely so as to reduce a total contact area of the contacts with the platform and the movable part. The reduction in the total contact area of the contacts with the platform and the movable part allows a secure adhesion or binding between the platform and the movable part with a small force. Notwithstanding, the contacts may extend entirely as in the conventional microactuator. The contacts may comprise bumps which include at least any one of a polysilicon layer, an insulation layer, a metal layer, and an organic layer. The platform may unitary be formed with the contacts.

Moreover, it is preferable that a side wall insulation layer is provided on side walls of at least any one of the stator electrode and the movable electrode, so that the stator electrode and said movable electrode are separated by the side wall insulation layer so as to prevent any possible formation of an electrical short circuit between the stator electrode and said movable electrode. The side wall insulation layer may comprise a silicon dioxide layer or a silicon nitride layer or combinations thereof.

Figure 7:
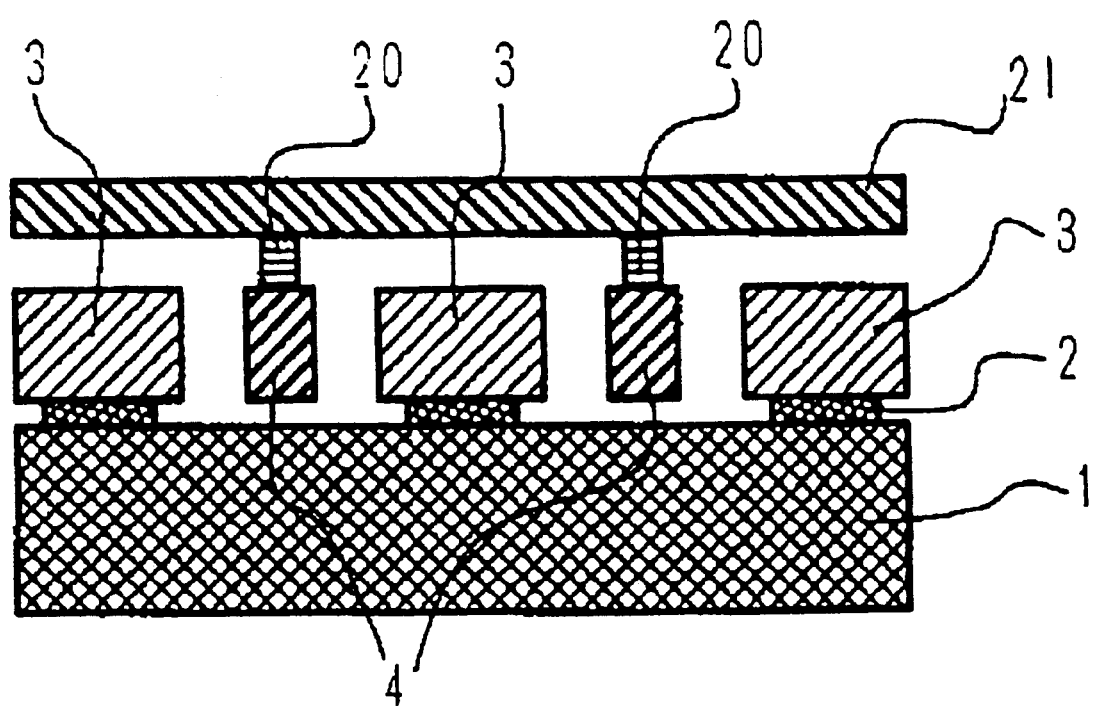
FIG. 7 is a cross sectional elevation view illustrative of a novel semiconductor microactuator with an improved platform in a second embodiment in accordance with the present invention.

A second embodiment according to the present invention will be described in detail with reference to the drawings. FIG. 7 is a cross sectional elevation view illustrative of a novel semiconductor microactuator with an improved platform in a second embodiment in accordance with the present invention. A structural difference of the second novel microactuator with the improved platform as shown in FIG. 7 from the first novel microactuator with the improved platform as shown in FIG. 5 is in that the bumps 20 are made of a different material from the platform 21. The platform 21 is supported by the bumps 20 over the movable comb-tooth portions 4. The platform 21 many comprise a flat glass plate having a thickness of 0.2 millimeters. The bumps 20 may comprise polysilicon and have a height of 4 micrometers. Other available materials for the bumps 20 are silicon dioxide, silicon nitride or a complex material thereof, metals such as tungsten, titanium, titanium nitride deposited by a sputtering method or a chemical vapor deposition method.

The platform 21 has the plane structure. The bumps are formed through the fabrication processes for the microactuator, for which reason a highly accurate alignment between the bumps 20 and the movable comb-tooth portions 4 can be made. The bumps 5 are provided on limited contact regions 35 of the movable comb-tooth portions 4 of the movable part 12 so as to reduce the contact area to realize the secure adhesion between the bumps and platform. The platform 21 is used for allowing a magnetic head or a slider to be mounted thereon.

Each of the stators 13 and 14 has a stator extending portion which extends toward inside regions and in the first direction and also extends along a longitudinal center line. The stator extending portion has many stator comb-tooth portions 3 which extend from both sides of each of the stator extending portions in a second direction perpendicular to the first direction, thereby to form a comb-shape, wherein the stator comb-tooth portions 3 are arranged at a first constant pitch in the first direction and extend in the second direction. Each of the stator comb-tooth portions 3 has comb-tooth shaped stator electrodes 33 which extend from one side of the stator comb-tooth portion 3, wherein the comb-tooth shaped stator electrodes 33 extend in the first direction at a second constant pitch.

Each of the movable part 12 comprises first and second side frame portions extending in the first direction and separated form each other in the second direction and a center frame portion extending in the second direction to connect the first and second side frame portions to each other. Each of the first and second side frame portions has many movable comb-tooth portions 4 which extend from the side toward the longitudinal center line in the second direction, thereby to form a comb-shape, wherein the movable comb-tooth portions 4 are arranged at a third constant pitch in the second direction and extend in the first direction. The many movable comb-tooth portions 4 and the many stator comb-tooth portions 3 are alternately aligned in the first direction, whereby each of the many movable comb-tooth portions 4 is positioned between adjacent two of the many stator comb-tooth portions 3. Each of the movable comb-tooth portions 4 has comb-tooth shaped movable electrodes 34 which extend from one side of the movable comb-tooth portion 4, wherein the comb-tooth shaped movable electrodes 34 extend in the first direction at a fourth constant pitch, so that the comb-tooth shaped movable electrodes 34 and the comb-tooth shaped stator electrodes 33 are alternately aligned in the second direction, whereby each of the comb-tooth shaped movable electrodes 34 is positioned between adjacent two of the comb-tooth shaped stator electrodes 33. The stator comb-tooth portion 3 is wider in width than the movable comb-tooth portion 4. The comb-tooth shaped stator electrodes 33 are wider in width than the comb-tooth shaped movable electrodes 34. The comb-tooth shaped stator electrodes 33 are adhered onto the silicon substrate 1 together with the many stator comb-tooth portions 3. The comb-tooth shaped movable electrodes 34 are separated or floated from the silicon substrate 1 together with the movable comb-tooth portion 4.

A voltage is applied across the comb-tooth shaped movable electrodes 34 and the comb-tooth shaped stator electrodes 33 so that the movable part 12 is driven to be moved in the first direction. The voltage application across the comb-tooth shaped movable electrodes 34 of the movable part 12 and the comb-tooth shaped stator electrodes 33 of the second stator 14 causes the movable part 12 to move toward the second stator 14. The voltage application across the comb-tooth shaped movable electrodes 34 of the movable part 12 and the comb-tooth shaped stator electrodes 33 of the first stator 13 causes the movable part 12 to move toward the first stator 13.

The movable comb-tooth portion 4 may comprise a single crystal silicon pattern having a width of 3 micrometers and a height of 20 micrometers. The stator comb-tooth portion 3 may comprise a single crystal silicon pattern having a width of 10 micrometers and a height of 20 micrometers. The comb-tooth shaped stator electrode 33 may comprise a single crystal silicon pattern having a width of 3 micrometers and a height of 20 micrometers. The comb-tooth shaped movable electrode 34 may comprise a single crystal silicon pattern having a width of 3 micrometers and a height of 20 micrometers. The comb-tooth shaped stator electrode 33 is spaced from the silicon substrate 1 The stator comb-tooth portion 3 is however fixed to the substrate 1 so that the comb-tooth shaped stator electrode 33 is substantially fixed through the stator comb-tooth portion 3 to the substrate 1. The platform 21 comprises a glass plate having a thickness of about 0.2 millimeters.

In the above embodiment, side walls of the stator comb-tooth portion 3 and side walls of the movable comb-tooth portion 4 are shown. As a modification to the above, it is, however, possible that the side walls of the stator comb-tooth portion 3 and side walls of the movable comb-tooth portion 4 are covered by side wall insulation films. The side wall insulation film may comprise a silicon dioxide film having a thickness of 100 nanometers or a silicon nitride film having a thickness of 100 nanometers. The provision of the side wall insulation films on the side walls of the stator comb-tooth portion 3 and the movable comb-tooth portion 4 prevents any formation of a short circuit between the that the movable part and the stator.

In accordance with the present invention, the platform is, therefore, made of an insulation material or a dielectric material which has a dielectric constant much lower than metals such as copper. By contrast to the present invention, the conventional platform is made of a metal such as copper. The use of dielectric material or the insulation material for the platform results in suppression of an electrostatic force to be applied between the platform and the stator of the microactuator. If, for example, the platform is made of a glass material having a dielectric constant of 4.1, then charges derived in the insulation material platform due to image-force caused by accumulated charges in the stator are reduced to about 60% of charges derived in the metal platform due to image-force caused by accumulated charges in the stator. An attractive force applied between the platform and the stator depends upon the distance between the platform and the stator and the amount of the charges derived in the platform. The distance between the platform and the stator is defined by the height of the contacts. Assuming that the height of the contacts for the insulation material platform is the same as the height of the contacts for the metal platform, the attractive force applied between the glass material platform and the stator is about 60% of the attractive force applied between the metal platform and the stator. Namely, the use of the glass material platform realizes about 40% reduction of the attractive force applied between the platform and the stator under the condition that the height of the contacts for the platform is unchanged. This means that the use of the insulation material for the platform allows a reduction in distance between the platform and the stator under the condition of unchanged attractive force applied between the platform and the stator. Namely, the use of the insulation material for the platform allows a reduction in the height of the contacts under the condition of unchanged attractive force applied between the platform and the stator. If, for example, the glass material having the dielectric constant of 4.1 is used for the platform, it is possible to reduce the height of the contacts into 40% under the condition of unchanged attractive force applied between the platform and the stator.

Accordingly, the use of the dielectric material partially or entirely for the platform reduces the amount of charges derived in the platform so that the image-force applied between the platform and the stator is reduced. This reduction in the image-force applied between the platform and the stator further reduces the attractive force applied between the platform and the stator. This reduction in reduces the attractive force applied between the platform and the stator suppresses the displacement of the platform toward the stator. This suppression to the displacement of the platform toward the stator allows a highly accurate positioning of the device such as magnetic or optomagnetic head mounted on the platform.

Alternatively, the platform may be made of a ceramic material or an organic polymer or other dielectric materials.

It is further preferable that the platform has a density lower than metals such as copper. If the platform is made of the glass material having a density of 2.2 which corresponds about one quarter of copper density, then the platform made of the glass material allows the microactuator to possess a resonant frequency which is higher by about two times than a resonant frequency of the actuator with the copper platform under the condition that the glass material platform has the same size than the copper platform. Namely, the platform is preferably made of the lower density material than metals, so that the microactuator possesses the higher resonant frequency, thereby allowing the microactuator exhibits an improved high speed responsibility required by the advanced magnetic or optomagnetic head.

Accordingly, the use of the lower density dielectric material partially or entirely for the platform reduces the mass of the platform which are fixed to the movable part of the microactuator. The reduction in the mass of the platform means the reduction in the total mass of the platform and the movable part, whereby the resonant frequency of the vibrator comprising the combined platform and the movable pair is increased. The increase in the resonant frequency of the vibrator comprising the combined platform and the movable part allows the microactuator to be improved in the high speed responsibility for satisfying the requirement for realizing the advanced micro-devices such as the advanced magnetic head or the advanced optomagnetic head.

Furthermore, it is preferable that a plurality of contacts which are in contact with parts of the platform and the movable part Namely; the contacts are formed partially or not entirely so as to reduce a total contact area of the contacts with the platform and the stator. The reduction in the total contact area of the contacts with the platform and the stator allows a secure adhesion or binding between the platform and the stator with a small force. Notwithstanding, the contacts may extend entirely as in the conventional microactuator. The contacts may comprise bumps which include at least any one of a polysilicon layer, an insulation layer, a metal layer, and an organic layer. The platform may unitary be formed with the contacts.

Moreover, it is preferable that a side wall insulation layer is provided on side walls of at least any one of the stator electrode and the movable electrode, so that the stator electrode and said movable electrode are separated by the side wall insulation layer so as to prevent any possible formation of an electrical short circuit between the stator electrode and said movable electrode. The side wall insulation layer may comprise a silicon dioxide layer or a silicon nitride layer or combinations thereof.

Figure 8A:
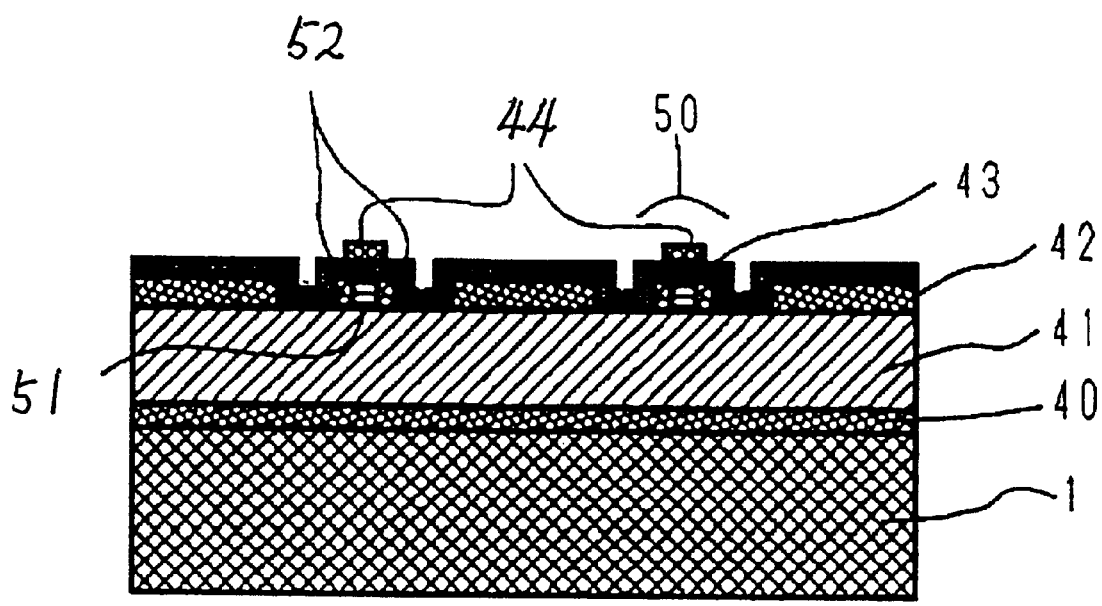
FIGS. 8A through 8C are fragmentary cross sectional elevation views illustrative of second novel actuators with improved platform structures of FIG. 7 in sequential processes involved in a novel method of fabricating the same in a second embodiment in accordance with the present invention.

With reference to FIG. 8A, an SOI substrate was prepared which comprises a semiconductor substrate 1 having a thickness of 500 micrometers, a silicon dioxide film 40 having a thickness of 0.5 micrometers, and a silicon layer 41 having a thickness of 20 micrometers. A silicon dioxide film 42 having a thickness of 3 micrometers is deposited on the silicon film 41. A photo-lithography is used to pattern a photo-resist for carrying out a dry etching process patterning the silicon dioxide film 24. The silicon oxide film 51 is selectively removed from bump bonding regions 51 to form a movable part pattern 52. The bump bonding regions 51 have rectangular shapes having 1 micrometer. A polysilicon film 43 is deposited by a low pressure chemical vapor deposition method. The polysilicon 43 has a thickness of about 2 micrometers so that the polysilicon 43 fills the bump bonding region 51. A silicon oxide film 44 having a thickness of 4 micrometers is deposited on the polysilicon film 43 to form bump patterns 50.

Figure 8B:
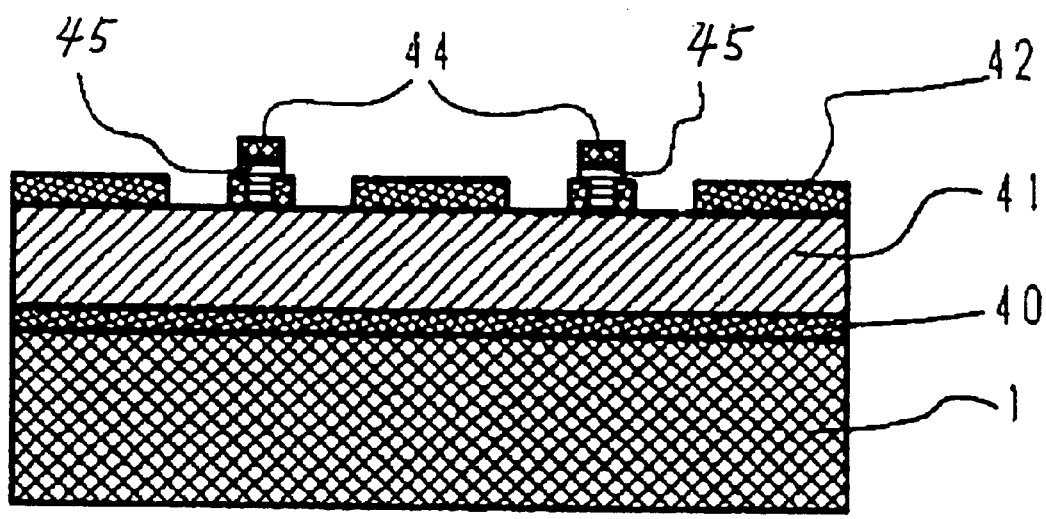

With reference to FIG. 8B, the silicon oxide film 44 is used as a mask for carrying out a plasma etching process by use of a chlorine gas to etch the polysilicon film 43 to form bumps 45.

Figure 8C:
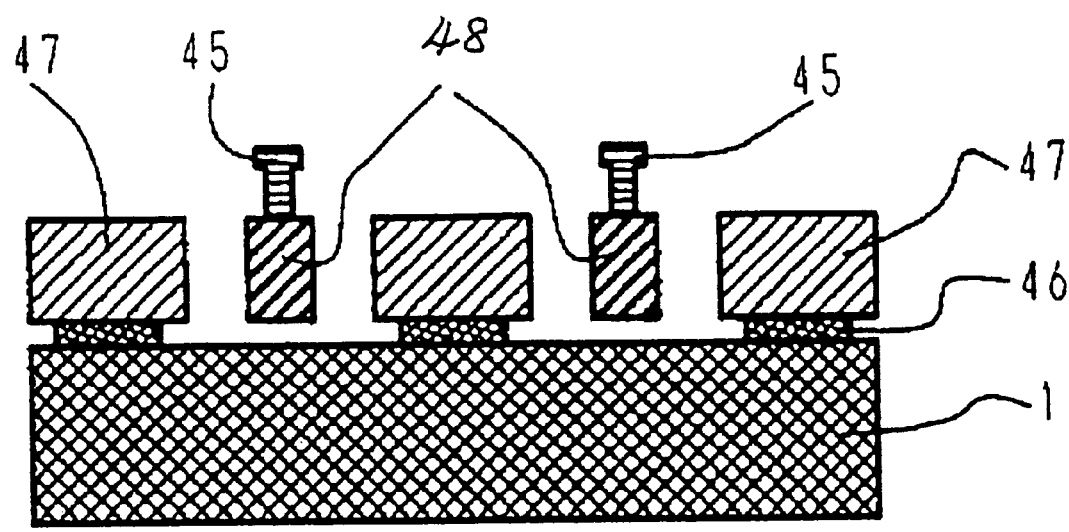

With reference to FIG. 8C, the above plasma etching process is continued with use of the silicon oxide films 42 and 44 as the masks to form the movable comb-tooth portion 48 and the stator comb-tooth portion 47. This substrate is dipped into a hydrofluoric acid solution to etch the oxide film 40. The etching time is so adjusted that the silicon oxide film 40 under the movable comb-tooth portion 48 is removed whilst the silicon oxide film 46 remains under the stator comb-tooth portion 47. The etching to the silicon oxide film removes the Silicon oxide films 44 and 42.

The patterns of the bumps 45 have been formed before the movable part 48 and the stator 47 are formed, so that there is risen no problem with a large step over the substrate.

Subsequently, a glass substrate of 1 millimeter square is prepared to be adhered onto the bumps 45 with an adhesive. In place of using the adhesive, it is possible that the silicon 41 and the glass plate are placed on a heater heated to a temperature of about 400° C. so as to apply a voltage of about 400V for carrying out an electrostatic bonding method. Alternatively, it is also possible that a gold is evaporated on a bonding surface between the bumps and the glass plate before the gold is melt by a heat for bonding the bumps and the glass plate.

In the above fabrication processes, the silicon oxide film 42 under the bumps 45 is finally removed. It is possible as a modification that the a part of the silicon oxide film 42 is positioned inside of the pattern of the bumps 45 so that the silicon oxide film 42 is removed by the wet etching with use of the hydrofluoric acid solution, whereby the bumps 45 are positioned over the silicon oxide film 42.

Figure 4:
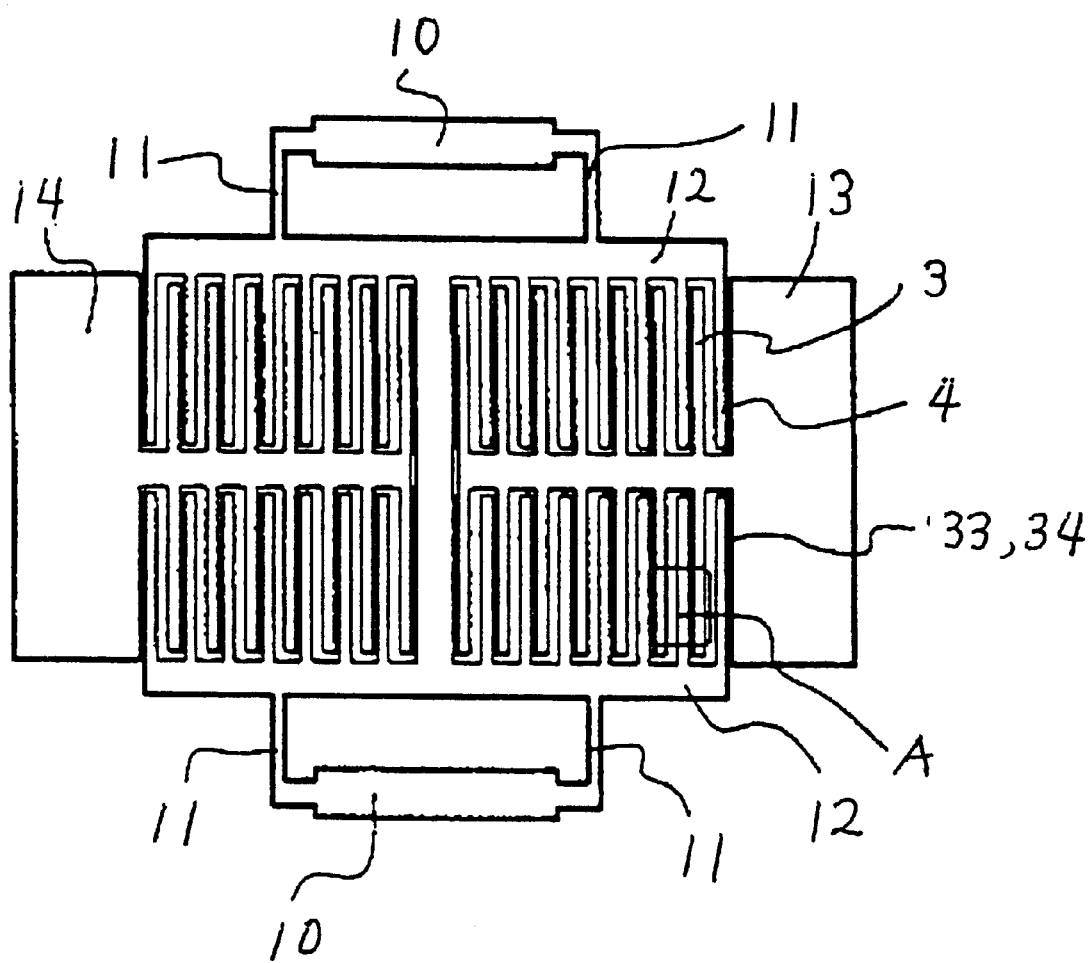
FIG. 4 is a plan view illustrative of a novel semiconductor microactuator with an improved platform in a first embodiment in accordance with the present invention.

In order to form the first microactuator of FIG. 4, the patterning of the silicon oxide film 42 and etching to the silicon film 41 have been made before the movable part 48 is removed by a hydrofluoric acid solution to form a microactuator. The glass plate is etched to form bumps 5 thereby forming a platform 6, before the glass plate is bonded to the microactuator.

The above fabrication processes for the microactuator with the platform arc simplified. There is risen no problem with the large step over the substrate. The platform may be formed on the single crystal silicon. This increase the freedom of selecting the materials for the microactuator and the fabrication processes in consideration of the practical requirement.

Whereas modifications of the present invention will be apparent to a person having ordinary skill in the art, to which the invention pertains, it is to be understood that embodiments as shown and described by way of illustrations arc by no means intended to be considered in a limiting sense. Accordingly, it is to be intended to cover by claims all modifications which fall within the spirit and scope of the present invention.

What is claimed is:

1. A semiconductor microactuator comprising:
    a stator having a stator electrode; and
    a movable part having a movable electrode,
    wherein a platform made of an insulator is provided over the movable part so that the platform is distanced from the stator, and wherein the platform includes plural discontinuous bumps that connect the platform to the movable part and the platform and the bumps are unitarily formed.

2. The microactuator as claimed in claim 1, wherein the movable part includes plural tines and the bumps are islands discontinuously distributed over each tine of the plural tines of the movable part.

3. The microactuator as claimed in claim 1, wherein insulation films are provided on side walls of at least one of the stator electrode and the movable electrode.

4. A semiconductor microactuator comprising:
    a stator having a stator electrode; and
    a movable part having a movable electrode,
    wherein a platform made of an insulator is provided over the movable part, and wherein the platform includes plural discontinuous bumps that connect the platform to the movable part and the platform has a planar shape and is securely adhered to the bumps.

5. The microactuator as claimed in claim 4, wherein insulation films are provided on side walls of at least one of the stator electrode and the movable electrode.

6. The microactuator as claimed in claim 4, wherein the movable part includes plural tines and the bumps are islands discontinuously distributed over each tine of the plural tines of the movable part.

7. A microactuator comprising:
    a stator electrode with plural generally parallel tines;
    a movable electrode with plural generally parallel tines interleaved with said plural tines of said stator electrode;

a platform made of an insulator and overlying both said stator electrode and said movable electrode; and each tine of said plural tines of said movable electrode being connected to said platform with a plurality of bumps that are spaced from each other and distributed along said tine.

* * * * *